United States Patent
Kumar et al.

(10) Patent No.: US 10,348,812 B2
(45) Date of Patent: Jul. 9, 2019

(54) STICKY SESSION DATA MIGRATION

(71) Applicant: VMware, Inc., Palo Alto, CA (US)

(72) Inventors: Prashant Kumar, Bangalore (IN);
Vineet Kumar Sinha, Bangalore (IN);
Prasenjit Sarkar, Singapore (SG);
Anoop Shukla, Bangalore (IN);
Hrishikesh Dalvi, Bangalore (IN)

(73) Assignee: VMware Inc., Palo Alto, CA (US)

(*) Notice: Subject to any disclaimer, the term of this patent is extended or adjusted under 35 U.S.C. 154(b) by 246 days.

(21) Appl. No.: 14/884,808

(22) Filed: Oct. 16, 2015

(65) Prior Publication Data
US 2016/0373520 A1  Dec. 22, 2016

(30) Foreign Application Priority Data
Jun. 22, 2015 (IN) .......................... 3121/CHE/2015

(51) Int. Cl.
*H04L 29/08* (2006.01)

(52) U.S. Cl.
CPC .......... *H04L 67/1002* (2013.01); *H04L 67/02* (2013.01); *H04L 67/1008* (2013.01); *H04L 67/1031* (2013.01); *H04L 67/14* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 2003/0014526 A1* | 1/2003 | Pullara | ............... | H04L 29/06 709/227 |
| 2006/0047751 A1* | 3/2006 | Chen | ............... | H04L 47/125 709/205 |
| 2007/0192492 A1* | 8/2007 | Okazaki | ............... | H04L 67/1027 709/226 |
| 2008/0059639 A1* | 3/2008 | Zhang | ............... | G06F 9/5083 709/227 |
| 2009/0303875 A1* | 12/2009 | Matsumura | ............... | H04L 47/10 370/230 |
| 2013/0054822 A1* | 2/2013 | Mordani | ............... | H04L 67/1034 709/228 |
| 2013/0238799 A1* | 9/2013 | Osamura | ............... | H04L 63/10 709/225 |
| 2014/0289415 A1* | 9/2014 | Chan | ............... | G06F 9/54 709/226 |
| 2014/0304409 A1* | 10/2014 | Kamath | ............... | H04L 67/1036 709/225 |

* cited by examiner

*Primary Examiner* — Younes Naji
(74) *Attorney, Agent, or Firm* — Thomas | Horstemeyer, LLP (57) ABSTRACT

Techniques for managing session data in a computer system having a plurality of servers establishing sessions with clients. Communications from any particular client are forwarded to the server assigned to handle that client. A load balancer may determine that any particular session for any particular client should be moved between servers, based on load balancing criteria. In this case, the load balancer causes session data for the server assigned to the client to be transferred to a different server. Acknowledgment signals are sent between the servers and load balancer to indicate completion status. Load balancer maintains backup data at secondary servers which can be brought online when a primary server becomes unresponsive. A method, system, and computer-readable medium are provided.

18 Claims, 5 Drawing Sheets

STICKY SESSION DATA MIGRATION

RELATED APPLICATIONS

Benefit is claimed under 35 U.S.C. 119(a)-(d) to Foreign application Serial No. 3121/CHE/2015 filed in India entitled "STICKY SESSION DATA MIGRATION", on Jun. 22, 2015, by VM ware, Inc., which is herein incorporated m its entirety by reference tear all purposes.

BACKGROUND

Many companies maintain data centers that include one or more servers to provide various computer-based services. Although a wide variety of services may be provided, some common examples include electronic shopping services, news services, mapping services, search services, and interpersonal messaging services (such as email). Data centers may include multiple servers to accommodate large computing loads associated with requests for services from clients in a robust manner. Such data centers may also include a load balancer that redirects traffic from servers that are experiencing heavy loads to servers that have greater availability.

Additionally, many servers provide services via a stateless protocol such as hyper text transfer protocol (HTTP). A stateless protocol is a protocol that does not require maintaining state between two entities communicating with the protocol. The benefits of stateless protocols are simplicity of interfaces, scalability of systems implementing the protocol, ubiquity of the protocols (e.g., in the case of HTTP), visibility of communications, portability of communications, and reliability of communications. However, with stateless protocols, the communications may not be natively aware of state. Thus, in order to maintain state associated with communications over a communications protocol, mechanisms that are external to the stateless communications protocol itself are used.

One way state may be maintained in conjunction with a stateless protocol is by using sessions. A session is a series of communications that are considered to be part of a single "conversation" and are stored locally. Communications between entities may utilize a session ID to identify a particular conversation. Servers can store state in order to maintain information about this conversation. In the example in which the service provided is electronic shopping, the state may include a cart that includes items a user has collected.

When used in conjunction with a load balancer, storing session information presents certain issues. Specifically, the task of a load balancer is to redistribute communications among multiple servers in order to balance the load experienced by each server. However, if the load balancer were to change which server services a particular session, from a first server to a second server, then session data would effectively be lost to the server handling the session, since the second server would not store or have access to the session data stored at the first server.

A technique known as "sticky sessions" is typically used to solve this issue. The technique involves preventing a load balancer from changing the server that services a particular session. Thus, ongoing sessions remain with their respective servers and are not affected by the load balancer. Although this technique allows session data to be retained in one server throughout a session, the technique of sticky sessions itself presents certain issues. Specifically, because a load balancer is unable to transfer communications associated with an ongoing session between servers, certain servers may accumulate sessions, and thus accumulate load, while other servers remain relatively free. With sticky sessions active, the load balancer would not be able to redirect traffic for the busier server as long as associated sessions remain active, thus negating the effectiveness of the load balancer. Another related issue is that adding servers to the data center does not immediately have an impact on the load of a particular server. This is because regardless of the number of servers available, traffic associated with ongoing sessions cannot be redirected if these sessions are sticky sessions. A further issue is that if a server becomes inactive, session data associated with that server may be lost.

SUMMARY

A method for managing session data in a computer system having a plurality of servers establishing sessions with clients is provided herein. The method includes in response to receiving a first request, generating a cookie identifying a first server of the computer system for responding to requests from a first client and transmitting the cookie to the first client. The method also includes forwarding a second request received from the first client to the first server based on the cookie included in the second request. The method further includes in response to detecting a load-related event associated with the computer system having the plurality of servers, determining: that session data associated with requests from the first client should be transferred from the first server to a second server. The method also includes generating an updated cookie identifying the second server for responding to requests from the first client and transmitting the updated cookie to the first client. The method further includes causing the first server to transmit the session data to the second server. The method also includes forwarding a third request received from the first client to the second server based on the updated cookie included in the third request.

A system is provided herein. The system includes a first server configured to process requests received from clients via a load balancer, a second server configured to process requests received from clients via the load balancer, and the load balancer configured to interface with a first client. The load balancer is configured to in response to receiving a first request, generate a cookie identifying the first server of the computer system for responding to requests from the first client and transmit the cookie to the first client. The load balancer is also configured to forward a second request received from the first client to the first server based on the cookie included in the second request. The load balancer is further configured to in response to detecting a load-related event associated with the first server, determine that session data associated with requests from the first client should be transferred from the first server to the second server. The load balancer is also configured to generate an updated cookie identifying the second server for responding to requests from the first client and transmit the updated cookie to the first client. The load balancer is further configured to cause the first server to transmit the session data to the second server. The load balancer is also configured to forward a third request received from the first client to the second server based on the updated cookie included in the third request.

A non-transitory computer-readable medium storing instructions that when executed by a processor, cause the processor to perform a method is provided. The method includes in response to receiving a first request, generating a cookie identifying a first server of the computer system for responding, to requests from a first client and transmitting the cookie to the first client. The method also includes forwarding a second request received from the first client to the first server based on the cookie included in the second request. The method further includes in response to detecting a load-related event associated with the computer system having the plurality of servers, determining that session data associated with requests from the first client should be transferred from the first server to a second server. The method also includes generating an updated cookie identifying the second server for responding to requests from the first client and transmitting the updated cookie to the first client. The method further includes causing the first server to transmit the session data to the second server. The method also includes forwarding a third request received from the first client to the second server based on the updated cookie included in the third request.

Further embodiments of the present invention include a computer system configured to carry out the above method, and a non-transitory computer-readable storage medium comprising instructions that cause the computer system to carry out the above methods.

BRIEF DESCRIPTION OF THE DRAWINGS

To facilitate understanding, identical reference numerals have been used, where possible, to designate identical elements that are common to the figures. It is contemplated that elements disclosed, in one embodiment may be beneficially utilized, on other embodiments without specific recitation.

DETAILED DESCRIPTION

Embodiments disclosed herein provide techniques for transferring session data between servers. A data center includes multiple servers that establish sessions with clients that request services from the servers. The servers store session data as a part of this process. A load balancer in the data center may determine, based on various operating conditions, that traffic from a client should be redirected from a first server with an active session for that client to a second server. The load balancer sends a transfer signal to the first server, which causes the first server to transfer session data for the client to the second server. When this transfer is complete, the first server sends a positive acknowledgment signal to the load balancer, which updates session information to indicate that the second server, rather than the first server, is handling the session. To provide robustness against a server becoming unavailable to process requests from clients, backup copies of session data may be stored in one or more other servers. When the server servicing requests of a particular client becomes unavailable, one of the servers storing backup data replaces the first server in the role of servicing the requests. Due to the presence of the backups, a server becoming unavailable does not cause session data to be lost.

Figure 1:
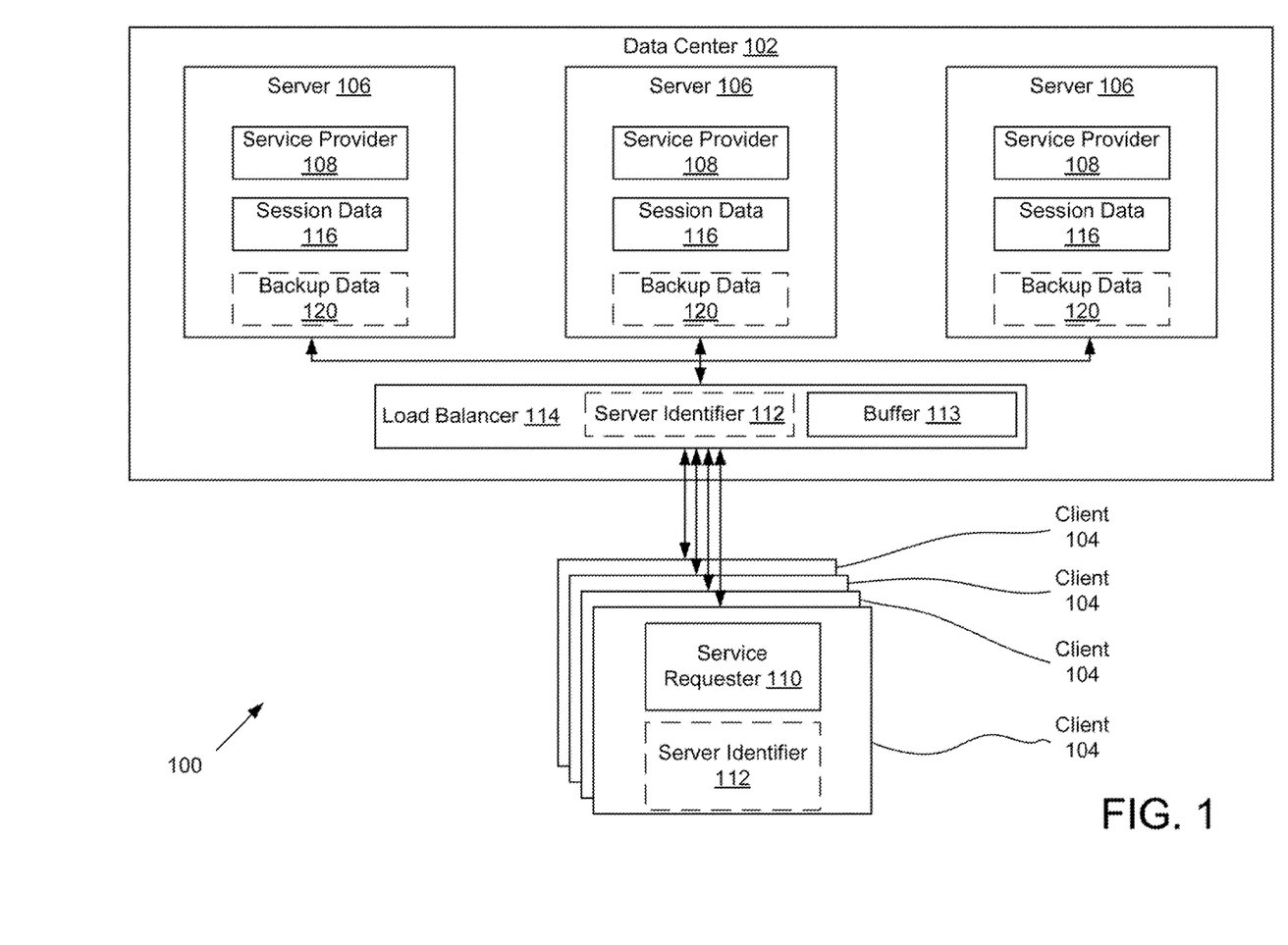
FIG. 1 is a block diagram of a load balancing system, according to an example.

FIG. 1 is a block diagram of a load balancing system 100, according to an example. As shown, the load balancing system 100 includes a data center 102 and one or more clients 104. Data center 102 includes servers 106 that execute software to provide services to clients 104 upon request.

Each client 104 represents a computing system that is able to request services from data center 102. In various embodiments, clients 104 may include standard computer systems including standard computing components such as processors, memory, non-volatile storage devices, input/output devices, and the like, arranged and interconnected in a standard manner. Clients 104 may include devices such as, without limitations, desktop computers, laptop computers, cellular phones, tablet computers, and the like. Each client 104 includes a service requester 110 that requests services from service provider 108 executing in servers 106. The services provided by service providers 108 may be any of a wide variety of services. One example of a type of service that could be provided is a web-based service such as an e-commerce website. Another example of a service is a remote desktop service, discussed in further detail with respect to FIG. 2.

Data center 102 includes a load balancer 114. Load balancer 114 acts as a reverse proxy. Specifically, load balancer 114 acts as a point-of-contact for data center 102 vis-á-vis clients 104. Load balancer 114 selects a server 106 to respond to service requests from clients 104 and forwards those service requests 104 to the selected server 106. Load balancer 114 selects a server 106 to respond to service requests based on how much load the different servers 106 are experiencing. More specifically, load balancer 114 selects servers 106 that are experiencing lower amounts of loading to service requests, to prevent overburdening any particular server 106.

In various embodiments, the communication protocol with which clients 104 communicate with data center 102 is a stateless communication protocol. Stateless protocols provide many benefits, such as simplicity, portability, and reliability. However, stateless protocols do not natively provide a mechanism for storing state associated with communications. One example of a stateless protocol is Hyper Text Transfer Protocol ("HTTP"), which is a ubiquitous, stateless communication protocol. Communications over HTTP are stateless in that there is no mechanism inherent to HTTP that maintains state associated with those communications. For this reason, many services that communicate with HTTP also include an additional mechanism to store state.

In the embodiments disclosed herein, to provide a mechanism for storing state for communications between clients 104 and servers 106, servers 106 store session data 116. Servers 106 have a notion of "sessions," which represent multi-message "conversations" between servers 106 and clients 104 that span a certain amount of time. Session data 116 is applicable to messages transmitted during a particular session between a server 106 and a client 104. For example, during a session, upon receiving a request for a service from a client 104, server 106 may respond to the request and store, modify, or delete information in Session data 116 corresponding to the particular client 104 that requested the service.

The fact that session data 116 is stored in servers 106 affects the functioning of load balancer 114. More specifically, because servers 106 store session data 116, load balancer 114 cannot simply change which server 106 responds to requests from clients 104. If a particular server 106 stores session data 116, then if load balancer 114 were to redirect communications associated with that session to a different server 106, the new server 106 would be unaware of the session data 116 stored at the old server 106. This lack of awareness of the session data 116 would mean that the interactions between the new server 106 and the client 104 would not be in accordance with this stored session data 116.

A technique known as "sticky sessions" prevents the load balancer 114 from changing which server 106 services requests from clients 104 that already have associated session data 116. In other words, for any particular client 104 that already has existing session data 116 stored at a particular server 106, the sticky sessions scheme prevents the load balancer 114 from directing traffic from that client 104 to a server 106 other than the server 106 storing the session data 116 for that client 104.

However, the use of sticky sessions, without more, presents certain issues. More specifically, data center 102 with servers 106 and a load balancer 114 that uses sticky sessions may direct unequal load to some servers 106. For example, servers 106 that manage longer-length sessions may accumulate sessions, while servers 106 that manage shorter-length sessions do not accumulate sessions. This may lead to some servers 106 servicing more sessions than others. Because the use of sticky sessions prevents communications related to ongoing sessions from being redirected, the load balancer 114 is unable to correct such imbalances. Another issue is that for similar reasons, adding servers 106 to data center 102 does not correct the imbalances. A further issue is that should one server 106 become unavailable, session data 116 for that server 106 would also become unavailable.

Thus, techniques are provided herein for migrating sessions between servers 106. Migrating sessions includes moving session data 116 from one server 106 to another server 106 and also includes causing a client 104 associated with that session data to communicate with the server 106 to which the session data 116 is migrated, instead of the server 106 from which the session data 116 is migrated. Servers 106 may implement a reliable messaging protocol in order to communicate with each other. Several examples of reliable messaging protocols include Advanced Message Queuing Protocol ("AMQP"), Web Application Messaging Protocol ("WAMP") or other protocols. By migrating the session data, load balancer 114 is able to change the server 106 that stores session data 116 for any particular session. Thus, servers 106 can utilize session data 116 during communication with clients 104 even if load balancer 114 redirects traffic between servers 106. It should be noted that the techniques described herein are implemented in addition to, and not instead of sticky sessions. More specifically, according to the techniques described herein, load balancer 114 does not redirect traffic from a client 104 that has an ongoing session without also migrating the session data 116 for that client.

Broadly, the techniques described herein include triggering a session data 116 migration operation when load balancer 114 determines that a particular session should be transferred from one server 106 to another server 106. To determine that a session should be transferred, load balancer 114 may use any of a variety of known techniques, in one example, load balancer 114 determines that additional processing tasks about to be assigned to a particular server 106 would cause that server to be "overloaded" that is, would have processing load above a certain threshold. In other examples, load balancer 114 may judge loading of a particular server 106 based on the number of activate connections for that server, the average response time for that server, the lowest response time for that server, and CPU and/or memory usage.

Once it is determined that a session should be transferred, load balancer 114 identifies a server 106 to which the session is to be transferred (a "destination server"). Load balancer 114 may identify this server 106 based on a wide variety of criteria. In one example, load balancer 114 identifies the server 106 that has the lowest processing load. In other examples, load balancer 114 may judge loading of a particular server 106 based on the number of activate connections for that server, the average response time for that server, the lowest, response time for that server, and CPU and/or memory usage.

After determining that a session should be transferred and determining which server 106 the session should be transferred to, load balancer 114, and the servers 106 cooperate to perform operations to transfer the session data. More specifically, after identifying the server 106 to which the session is to be transferred, load balancer 114 transmits a session transfer instruction to the server 106 that is to transfer the session (the "transferring server"). Load balancer 114 also holds requests for services from the client 104 for which the session is being transferred. Holding requests means storing the requests temporarily and not transmitting the requests to a server 106 for processing. These held requests may be stored in a buffer 113 and are released after the session transfer is completed.

When the transferring server receives the session transfer instruction, the transferring server transmits the session information to the destination server. If the destination server successfully receives the session information, then the destination server responds to the transfer request with a positive acknowledgment signal. If the destination server does not successfully receive the session information, then the destination server responds to the transfer request with a negative acknowledgment signal or does not respond at all. If the transferring server receives a positive acknowledgment signal from the destination server, then the transferring server transmits a positive acknowledgment to load balancer 114. If the transferring server receives a negative acknowledgment signal from the destination server or does not receive an acknowledgment signal within a timeout period, then the transferring server transmits a negative acknowledgment signal to load balancer 114.

If load balancer 114 receives a positive acknowledgment signal from the transferring server, then load balancer 114 releases the held requests from the client 104 associated with the transferred session to the destination server and also begins directing traffic to the destination server instead of the transferring server. If load balancer 114 receives a negative acknowledgment signal from the transferring server, then load balancer 114 releases the held requests from the client 104 associated with the transferred session to the transferring server (instead of the destination server, since the session transfer failed), and continues to direct traffic for the session that failed to be transferred to the transferring server.

When accepting requests for services from clients 104, load balancer 114 examines a server identifier 112 in order to determine which server 106 stores the session data 116. More specifically, in order to identify which server 106 stores session data 116 for a particular client 104, either data center 102 or the client 104 may store a server identifier 112.

The server identifier 112 associates a client 104 with a particular server 106 that stores session data 116 for that client 104. Load balancer 114 may store a server identifier 112 for each client. 104 that has associated session data 116. Alternatively, each client 104 for which associated session data 116 is stored may store an associated server identifier 112.

When a client 104 transmits a request for a service to load balancer 114, load balancer 114 examines the server identifier 112 associated with the client 104 from which the request is received and directs the request to the server 106 identified in the server identifier 112. When load balancer 114 transfers a session from one server 106 to another server 106 in a session transfer information, described above, load balancer 114 modifies the corresponding server identifier 112 accordingly.

The server identifier 112 may be stored in accordance with many different techniques, but two examples are specifically provided. In one example, load balancer 114 stores server identifiers 112. In such an example, load balancer 114 would store a server identifier 112 for each client 104 for which session data 116 is stored in a server 106. When load balancer 114 receives a communication from a client 104, load balancer 114 would examine the stored server identifier 112 corresponding to the client 104 and would identify which server 106 stores the session data for that client 104. Load balancer 114 would direct the communication from the client 104 to the identified server 106. The information stored in server identifier 112 may identify a client 104 in a number of ways. In one example, server identifier 112 may include an internet protocol (IP) address, associating that address with the server 106 associated with the server identifier 112.

In another example, load balancer 114 identifies which server 106 stores session data 116 for a particular communication based on a browser cookie stored at the client 104 from Which the communication is received. Browser cookies are a mechanism for storing state in conjunction with HTTP. With browser cookies, when a server 106 services a request from a client 104, that server 106 may also transmit to the client 104, data for storage as a browser cookie. The browser cookie includes an identification of the web server that requests the cookie to be stored (e.g., an HTTP web server address or a domain name) and also includes associated custom data. Subsequently, when that client 104 requests an HTTP resource having the same HTTP address (or same server name or domain name) as a stored browser cookie, the client 104 transmits that cookie to the server to which the request is made.

As described above, load balancer 114 acts as a reverse proxy for servers 106 in data center 102. Thus, when making HTTP requests, client 104 does not directly address a particular server 106. Because client 104 does not address the servers 106 individually, but instead addresses the data center 102 as a whole, clients 104 may store in a browser cookie, an indication of which server 106 stores associated session data 116. This indication would be stored initially, upon first contact with data center 102, at the direction of a load balancer 114. More specifically, in response to a communication from a client 104 for which no session data 116 is stored in a server 106, load balancer 114 would choose a particular server 106 to service requests for client 104 and would transmit a browser cookie to that client 104 with an identification of the chosen server 106. Subsequently, when that client 104 communicates with data center 102, client 104 would transmit the browser cookie, including the identification of the server 106, to load balancer 114 so that load balancer 114 knows which server 106 to direct the client 104 communication.

Servers 106 may become unavailable and unable to respond to requests for various reasons such as hardware failure, software failure, failure of connection, and the like. Thus, servers 106 may store backup data 120 for one or more other servers 106. Backup data 120 stored at any particular server 106 includes a backup of session data 116 for one or more sessions for which session data 116 is stored at a different server. This backup data 120 is available in the event that a server 106 becomes unavailable and thus unable to respond to requests for services from a client 104 for which session data 116 is stored at that server 106.

The server 106 that stores session data 116 and is assigned to service requests from clients 104 associated with that session data is referred to as a "primary server" herein and the server 106 that stores backup data 120 corresponding to that session data 116 is referred to as a "secondary server" herein. The primary server may store backup data 120 in one or more secondary servers whenever a change in session data 116 occurs, periodically, based on a schedule, or based on other factors or triggers.

To store backup data 120, a primary server transmits a synchronization message to a secondary server. If the secondary server does not yet store any backup data 120 for a particular session, then the primary server transmits the entirety of session data 116 for which storage is desired. If the secondary server already stores some backup data 120 for a particular session, then the primary server transmits changes to session data 116 that have been made since previously sending session data 116 to the secondary server.

Upon receiving the backup data 120 from the primary server, the secondary server writes this data into its stored backup data 120 and, if successful, sends a positive acknowledgment to the primary server. If the storage of the change data is unsuccessful, then the secondary server sends a negative acknowledgment to the primary server. If the primary server receives a negative acknowledgment, then the primary server retransmits the session data 116 to the secondary server. If the primary server receives a positive acknowledgment, then the transfer of data is successful and the primary server does not retransmit the change in session data 116 to the secondary server.

When data center 102 is operating to service requests from clients 104, if a primary server becomes unable to respond to requests from a client 104, then load balancer 114 performs operations to convert one of the secondary servers to a primary server. Specifically, upon determining that a primary server is unavailable, load balancer 114 chooses a secondary server that stores session data for a particular client and modifies that secondary server to be the primary server for that session data and client. Load balancer 114 also modifies server identifier 112 to indicate that the new primary server is associated with the transferred session data 116 instead of the old primary server. If the server identifier 112 is stored in load balancer 114, then server identifier 112 simply changes the corresponding data. If the server identifier 112 is a browser cookie stored at the client 104, then load balancer 114 transmits a new browser cookie that identifies the new primary server instead of the old primary server. Subsequent communication from the client 104 would thus include this updated browser cookie with an indication of the updated server 106.

When a server 106 becomes unavailable, load balancer 114 may configure a new server 106 from available computing resources in order to replace the unavailable server 106. This operation would restore the amount of available resources to the level that existed prior to the server 106 becoming unavailable.

Figure 2:
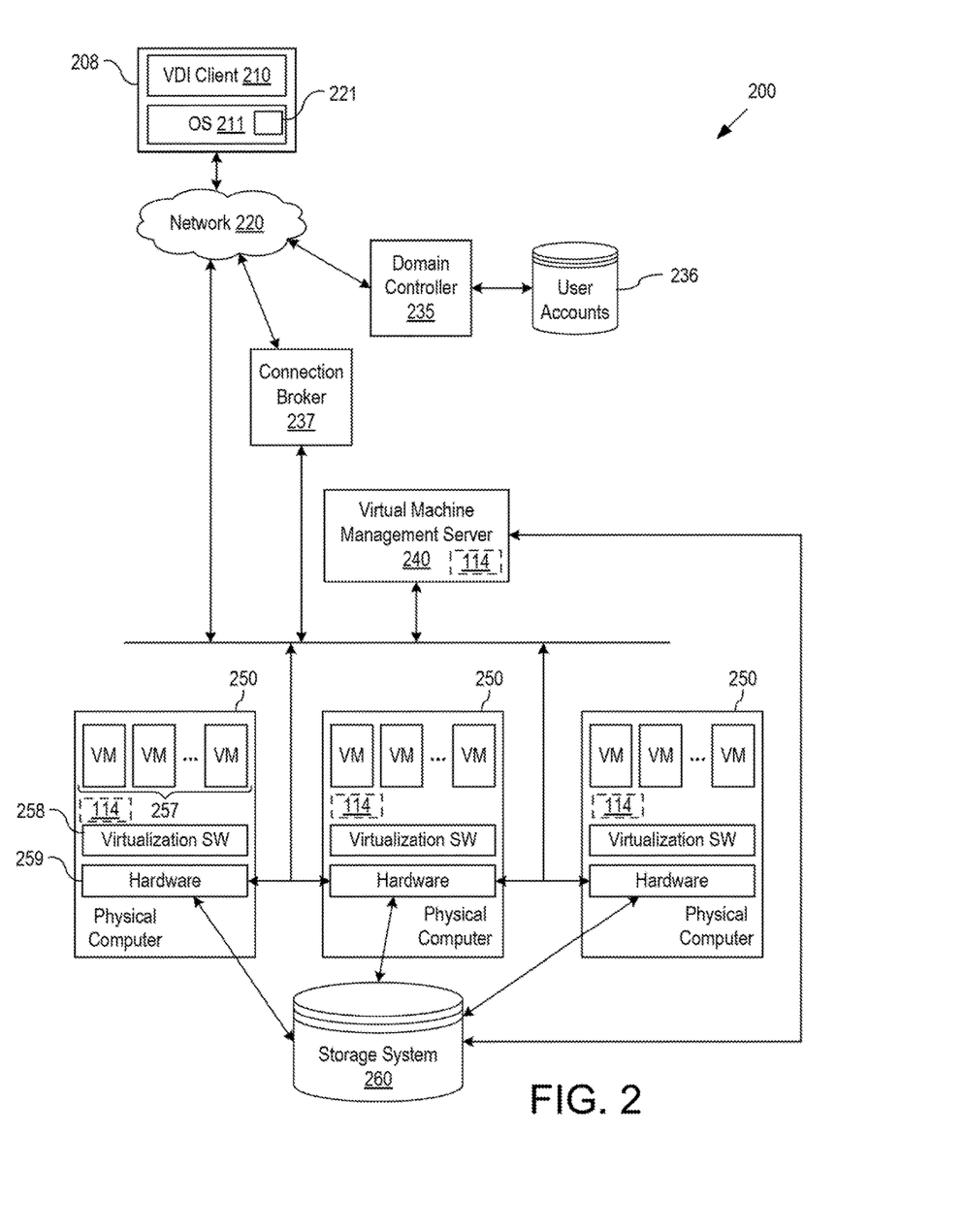
FIG. 2 illustrates components of a virtualized desktop infrastructure (VDI) system that is an example of a system that implements aspects of the load balancing system described with respect to FIG. 1.

FIG. 2 illustrates components of a virtualized desktop infrastructure (VDI) system 200 that is an example of a system that implements aspects of the load balancing system 100 described with respect to FIG. 1. The VDI system 200 includes multiple systems referred to as "physical computers" 250, which correspond to the servers 106 of FIG. 1. Each physical computer 250 executes software elements and stores data illustrated in FIG. 1, including service provider 108, session data 116, and backup data 120. VDI system 200 also includes a virtual machine management server 240 that manages execution of virtual machines 257 within physical computers 250. In some embodiments, virtual machine management server 240 executes the load balancer 114 of FIG. 1. In other embodiments, one of physical computers 250 executes the load balancer 114. The clients 104 of FIG. 1 correspond to the client machines 208 illustrated in FIG. 2. Additional elements are included, in FIG. 2 to illustrate particular details of the VIM system 200.

In VDI system 200, VDI client software programs (also referred to as "VDI clients" for short), e.g., VDI client 210, run on operating systems of local computing devices, e.g., client machine 208 on top of an operating system (OS) 211. VDI clients 210 provide an interface for the users to access their desktops, which may be running in one of virtual machines 257 or blade server (not shown) in a data center that is remote from the user locations. The term "desktop" refers to the instance of an interactive operating environment provided by a computer operating system and software applications, typically in the form of a display and sound output and keyboard and mouse input. With VDI clients 210, users can access desktops running in a remote data center through network 220, from any location, using a general purpose computer running a commodity operating system and a VDI client software program such as VMware® View™, or a special purpose thin client such as those available from Dell, HP, NEC, Sun Microsystems, Wyse, and others.

VDI system 200 includes a domain controller 235, such as Microsoft® Active Directory®, that manages user accounts 236 including user login information, and a connection broker 237 that manages connections between VDI clients and desktops running in virtual machines 257 or other platforms. Domain controller 235 and connection broker 237 may run on separate servers or in separate virtual machines running on the same server or different servers. In the embodiments of the present invention illustrated herein, desktops are running in virtual machines 257 and virtual machines 257 are instantiated on a plurality of physical computers 250, each of which includes virtualization software 258 and hardware 259, is controlled by a virtual machine management server 240, and is coupled to a shared persistent storage system 260. Virtualization software 258 may be a bare-metal hypervisor such as vSphere® ESXi™ commercially available from VMware, Inc, of Palo Alto, Calif. Alternatively, virtualization software 258 may be a hypervisor that executes on top of an operating system which is executing on hardware 259. Hypervisors provide a software interface layer that abstracts computing hardware resources into virtualized hardware, enabling sharing of the computing hardware resources among virtual machines 257.

All of the components of VDI system 200 communicate via network 220. For simplicity, a single network is shown but it should be recognized that, in actual implementations, the components of VDI system 200 may be connected over the same network or different networks. Furthermore, a particular configuration of the virtualized desktop infrastructure is described above and illustrated in FIG. 2, but it should be recognized that one or more embodiments of the present invention may be practiced with other configurations of the virtualized desktop infrastructure.

To access a remote desktop, a user provides user credentials to client machine 208 to log in to client machine. Subsequently, the user launches VDI client 210, which results in user interface 221 being displayed on client machine 208. User subsequently logs into a remote desktop service executing in a virtual machine 257 of a physical computer 250. The remote desktop service provides a remote desktop, consisting of video and sound output, and keyboard and mouse input, to client machine 208 via network 220.

Load balancer 114 manages connections between VMs 257 and client machines 208. More specifically, load balancer 114 redirects remote desktop traffic between VMs 257 executing on different physical computers 250 and may transfer session data and perform other operations as described above with respect to FIG. 1 in order to balance the loads associated with VDI traffic.

Figure 3:
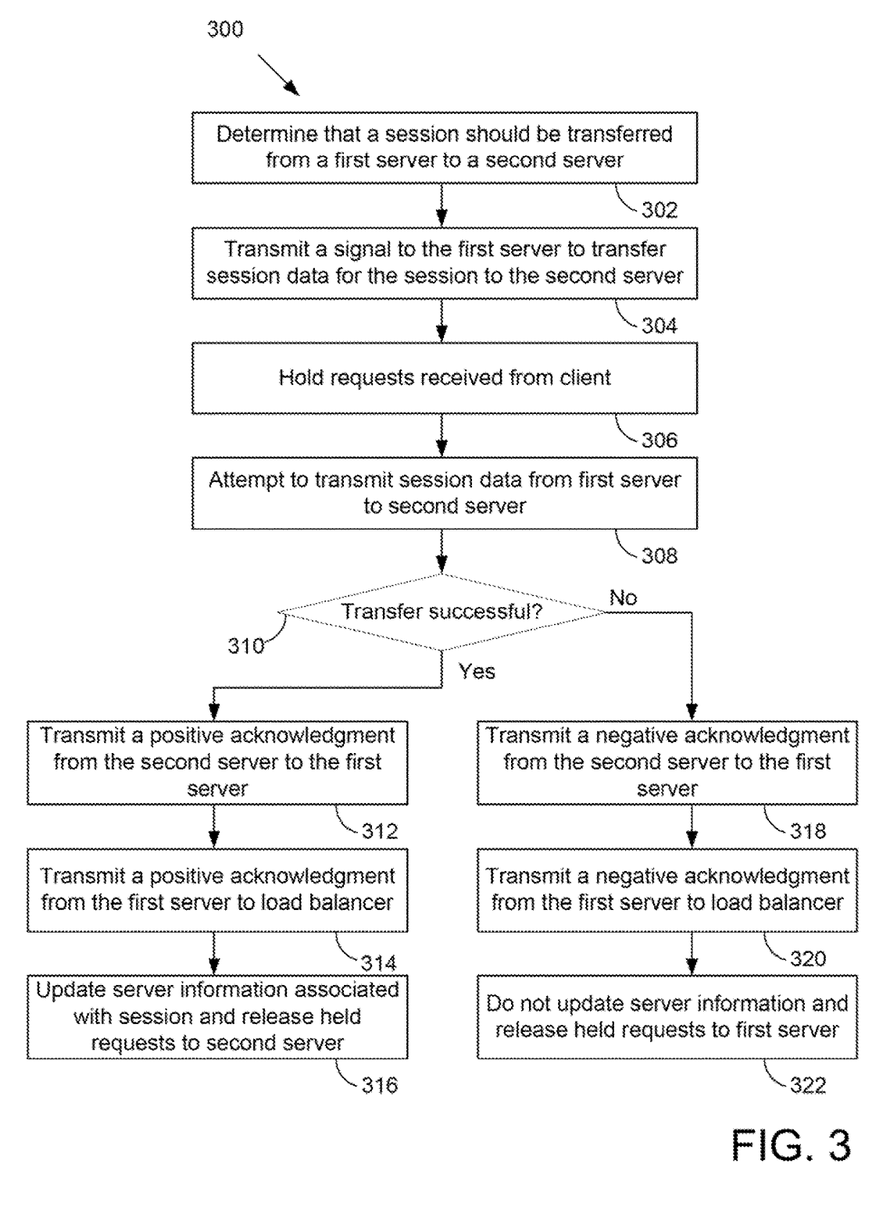
FIG. 3 is a flow diagram of a method for migrating session data when a load balancing operation occurs, according to an embodiment.

FIG. 3 is a flow diagram of a method 300 for migrating session data when a load balancing operation occurs, according to an embodiment. The method 300 begins at step 302. At step 302, load balancer 114 determines that a session should be transferred from a first server 106 to a second server 106. Load balancer 114 may make this determination in a variety of ways. In one example, load balancer 114 may determine that the first server 106 is overburdened and that the second server 106 has available processing time. At step 304, load balancer 114 transmits a signal to the first server 106 to cause the first server 106 to transfer the session to the second server 106. At step 306, load balancer 114 holds requests from the client 104 associated with the session to be transferred. The requests are received after load balancer 114 begins a session transfer operation but before that session transfer operation is complete. Thus, neither the first server 106 nor the second server 106 are available to service requests that are received. For this reason, load balancer 114 holds the requests mentioned above.

At step 308, the first server 106 attempts to transmit session data to the second server 106. At step 310, if the transfer is successful, then method 300 proceeds to step 312. At step 310, if the transfer is not successful, then method 300 proceeds to step 318.

At step 312, the second server 106 transmits a positive acknowledgment to the first server 106, indicating that the transfer has successfully completed. At step 314, having received a positive acknowledgment from the second server 106, indicating that the transfer from the first server 106 to the second server 106 has successfully completed, the first server 106 transmits a positive acknowledgment to load balancer 114. At step 316, load balancer 114 updates server information associated with the transferred session and releases held requests to the second server 106, which is processing requests associated with the transferred session instead of the first server 106.

At step 318 (which is performed if the transfer of the session from the first server 106 to the second server 106 is unsuccessful), the second server 106 transmits a negative acknowledgment to the first server 106, indicating that the transfer of the session is unsuccessful. At step 320, the first server 106 transmits a negative acknowledgment to load balancer 114, also indicating that the transfer of the session information is unsuccessful. At step 322, load balancer 114 does not update the server information and releases the held requests to the first server 106. The first server 106 is still servicing requests associated with the session for which the transfer fails.

Figure 4:
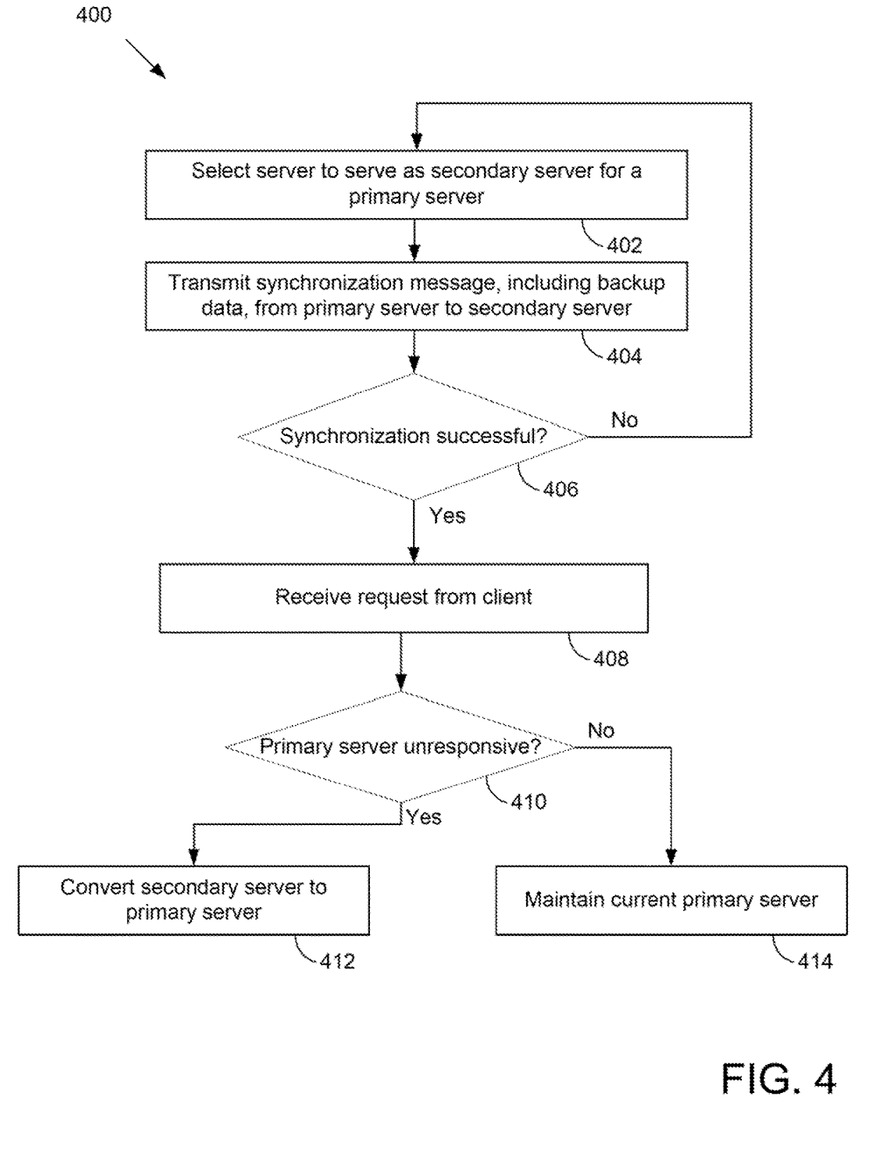
FIG. 4 is a flow diagram of a method for managing backup data stored in a server of data center, according to an embodiment.

FIG. 4 is a flow diagram of a method 400 for managing backup data stored in a server 106 of data center 102, according to an embodiment. The method begins at step 400, where load balancer 114 selects a server 106 to serve as a secondary (or "backup") server for a different server (deemed the "primary server"). A secondary server stores backup data for an associated primary server but does not service client requests for that backup data. Load balancer 114 may select a server 106 based on any feasible technique, including techniques that account for load balancing characteristics of the servers 106. At step 404, a primary server 106 transmits a synchronization message to the selected secondary server, where the synchronization message includes backup data to be stored. Note that the step of selecting a secondary server need not be performed each time a primary server transmits a synchronization message to a secondary server. Instead, a load balancer 114 may select a secondary server during an initial period, after which the secondary server remains as selected until changed.

At step 406, load balancer 114 determines whether the synchronization is successful. In some embodiments, secondary server 106 may transmit a positive acknowledgement message to primary server 106 when secondary server 106 successfully receives backup data from the primary server 106 and primary server 106 may then send a positive acknowledgment signal to load balancer 114 to indicate that the synchronization is successful. If the synchronization is not successful, then method 400 returns to step 402. At step 402, because the synchronization was not successful, load balancer 114 selects a new secondary server 106 to receive synchronization data. At step 406, if the synchronization is successful, then method 400 proceeds to step 408.

At step 408, load balancer 114 receives a request from a client 104. The load balancer 114 forwards the request to primary server 106 for processing. At step 410, load balancer 114 detects whether primary server 106 is unresponsive. If primary server 106 is unresponsive, then method 400 proceeds to step 412 and if primary server is not unresponsive, then method 400 proceeds to step 414. At step 412, load balancer 114 converts secondary server 106 to primary server 106, forwarding all requests to (now current) primary server 106. At step 414, load balancer 114 maintains the current primary server 106.

Figure 5:
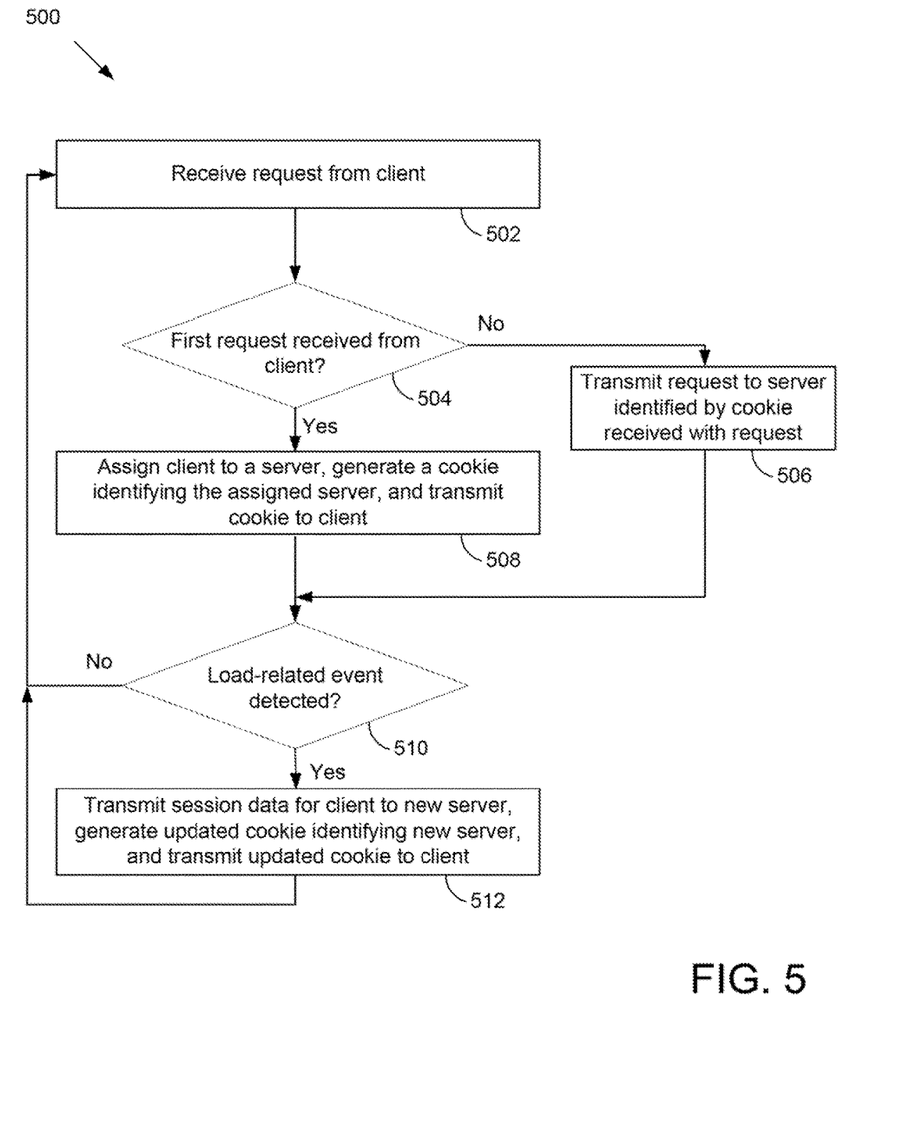
FIG. 5 is a flow diagram of a method for directing requests received from clients, according to an embodiment.

FIG. 5 is a flow diagram of a method 500 for directing requests received from clients, according to an embodiment. The method 500 begins at step 502, where load balancer 114 receives a request from a client. At step 504, load balancer 114 determines whether the request is a first request received from that client. If the request is a first request, then the method 500 proceeds to step 508. If the request is not a first request, then the method 500 proceeds to step 506. At step 508, load balancer 114 assigns the client to a server, generates a cookie identifying the assigned server, and transmits the cookie to the client for future use. At step 506, load balancer 114 transmits the received request to the server identified by the cookie received with the request.

At step 510, load balancer 114 determines whether a load-related event occurs. A load-related event may include a determination that servers are processing unbalanced loads, a determination that a new server has been added, or a determination that a server has become unresponsive. If a load-related even is not detected, then the method returns to step 502 and if a load-related even is detected, then the method proceeds to step 512. At step 512, load balancer 114 causes session data for the client to be transferred from one server to another server in order to alleviate the load-related even. Load balancer 114 also generates an updated cookie identifying the new server and transmits the updated cookie to the client for future use.

Advantageously, embodiments disclosed herein allow session data to be migrated between servers of a data center that includes a load balancer. Migrating session data allows the load balancer to redirect traffic between servers to maintain even load among the servers without disrupting the ability of servers to generate, update, and maintain session data. Thus, with the techniques provided herein, the benefits of storing session data, which include more powerful communications over stateless protocols, may be obtained in conjunction with the benefits of load balancing, which include the ability to improve performance of individual servers in data centers that include multiple servers. The techniques provided herein also provide for backup session data to be maintained, which improves stability of the data center, as servers can compensate for other servers becoming unavailable.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for managing session data in a computer system having a plurality of servers establishing sessions with clients, the method comprising:
    in response to receiving a first request from a first client through a connection broker, generating a cookie identifying a first server of the computer system for responding to requests received from the first client through the connection broker and transmitting the cookie to the first client;
    selecting a second server of the computer system as a backup server to store the requests received from the first client through the connection broker;
    forwarding a second request received from the first client through the connection broker to the first server based on the cookie included in the second request;
    in response to detecting a load-related event associated with the computer system having the plurality of servers, determining that a session data associated with the requests received from the first client through the connection broker should be transferred from the first server to the second server;
    causing the first server to initiate transmission of the session data to the second server;
    determining whether transmission of the session data to the second server is successful;
    in response to determining that the transmission of the session data to the second server is successful:
        receiving, from the first server, a positive acknowledgment indicating that the transmission of the session data is successfully completed;
        updating server information associated with the session data to indicate that the session data is associated with the second server;
        generating an updated cookie identifying the second server for responding to requests from the first client and transmitting the updated cookie to the first client; and
        forwarding a third request received from the first client through the connection broker to the second server for processing based on the updated cookie included in the third request; and
    in response to determining that the transmission of the session data to the second server is not successful:
        receiving, from the first server, a negative acknowledgment indicating that the transmission of the session data is not successfully completed;
        maintaining the server information associated with the session data to indicate that the session data is associated with the first server;
        forwarding the third request received from the first client through the connection broker to the first server for processing.

2. The method of claim 1, further comprising:
    after causing the first server to initiate transmission of the session data, receiving a fourth request from the first client associated with the cookie; and temporarily storing the fourth request and suspending forwarding of the fourth request to the first server.

3. The method of claim 2, further comprising: in response to determining that the transmission of the session data to the second server is successful, then transmitting the fourth request to the second server for processing; and in response to determining that the transmission of the session data to the second server is not successful, then transmitting the fourth request to the first server for processing.

4. The method of claim 1, further comprising: causing a copy of the requests received from the first client to be stored in the second server, wherein the requests received from the first client comprise the first request and the second request.

5. The method of claim 4, wherein: in response to determining that the transmission of the session data to the second server is successful, then selecting a third server of the computer system as a backup server to store subsequent requests received from the first client through the connection broker.

6. The method of claim 4, further comprising:
detecting that the first server has become unavailable; and
modifying the server information associated with the session data to indicate that the second server is a primary server to service requests received from the first client associated with the cookie.

7. The method of claim 1, wherein: the load-related event comprises one of a load imbalance among servers of the computer system, the first server becoming unresponsive, and a new server is added to the computer system.

8. A system for managing data, comprising:
a first physical server of a computer system having a plurality of servers, the first physical server configured to process requests received from clients through a connection broker;
a second physical server of a computer system having a plurality of servers, the second physical server configured to process the requests received from the clients through the connection broker; and
a load balancer configured to interface with the connection broker, the load balancer configured to:
in response to receiving a first request from a first client through the connection broker, generate a cookie identifying the first physical server of the computer system for responding to requests received from the first client through the connection broker and transmit the cookie to the first client;
select the second physical server as a backup server to store the requests received from the first client through the connection broker;
forward a second request received from the first client through the connection broker to the first physical server based on the cookie included in the second request;
in response to detecting a load-related event associated with the first physical server, determine that a session data associated with the requests received from the first client through the connection broker should be transferred from the first physical server to the second physical server;
cause the first physical server to initiate transmission of the session data to the second physical server;
determine whether transmission of the session data to the second physical server is successful;
in response to determining that the transmission of the session data to the second physical server is successful, then:
receiving, from the first physical server, a positive acknowledgment indicating that the transmission of the session data is successfully completed;
update server information associated with the session data to indicate that the session data is associated with the second physical server;
generate an updated cookie identifying the second physical server for responding to the requests received from the first client through the connection broker and transmitting the updated cookie to the first client; and
forward a third request received from the first client through the connection broker to the second physical server for processing based on the updated cookie included in the third request; and
in response to determining that the transmission of the session data to the second physical server is not successful, then:
receive, from the first physical server, a negative acknowledgment indicating that the transmission of the session data is not successfully completed;
maintain the server information associated with the session data to indicate that the session data is associated with the first physical server;
forward the third request received from the first client through the connection broker to the first physical server for processing.

9. The system of claim 8, wherein the load balancer is further configured to:
after causing the first physical server to initiate transmission of the session data, receive a fourth request from the first client associated with the cookie; and
temporarily store the fourth request and suspend forwarding of the fourth request to the first physical server.

10. The system of claim 9, wherein the load balancer is further configured to:
in response to determining that the transmission of the session data to the second physical server is successful, then transmit the fourth request to the second physical server for processing; and in response to determining that the transmission of the session data to the second physical server is not successful, then transmit the fourth request to the first physical server for processing.

11. The system of claim 8, wherein the load balancer is further configured to:
cause a copy of the requests received from the first client to be stored in the second physical server, wherein the requests received from the first client comprise the first request and the second request.

12. The system of claim 11, wherein: in response to determining that the transmission of the session data to the second physical server is successful, then selecting a third physical server as a backup server to store subsequent requests received from the first client through the connection broker.

13. The system of claim 11, wherein the load balancer is further configured to:
detect that the first physical server has become unavailable; and
modify the server information associated with the session data to indicate that the second physical server is a primary server to service requests received from the first client associated with the cookie.

14. The system of claim 8, wherein: the load-related event comprises one of a load imbalance among servers of the computer system, the first physical server becoming unresponsive, and a new physical server is added to the computer system.

15. A non-transitory computer-readable medium storing instructions that when executed by a computer system, cause the computer system to perform a method, the method comprising:
    in response to receiving a first request from a first client through a connection broker, generating a cookie identifying a first server of the computer system for responding to requests received from the first client through the connection broker and transmitting the cookie to the first client;
    selecting a second server of the computer system as a backup server to store the requests received from the first client through the connection broker;
    forwarding a second request received from the first client through the connection broker to the first server based on the cookie included in the second request;
    in response to detecting a load-related event associated with the computer system, determining that a session data associated with the requests received from the first client through the connection broker should be transferred from the first server to the second server;
    causing the first server to initiate transmission of the session data to the second server;
    determining whether transmission of the session data to the second server is successful; in response to determining that the transmission of the session data to the second server is successful, then:
    receiving, from the first server, a positive acknowledgment indicating that the transmission of the session data is successfully completed;
    updating server information associated with the session data to indicate that the session data is associated with the second server;
    generating an updated cookie identifying the second server for responding to requests from the first client and transmitting the updated cookie to the first client; and
    forwarding a third request received from the first client through the connection broker to the second server for processing based on the updated cookie included in the third request; and
    in response to determining that the transmission of the session data to the second server is not successful, then:
    receiving, from the first server, a negative acknowledgment indicating that the transmission of the session data is not successfully completed;
    maintaining the server information associated with the session data to indicate that the session data is associated with the first server;
    forwarding the third request received from the first client through the connection broker to the first server for processing.

16. The non-transitory computer-readable medium of claim 15, wherein the method further comprises causing a copy of the requests received from the first client to be stored in the second server, wherein the requests received from the first client comprise the first request and the second request.

17. The non-transitory computer-readable medium of claim 16, wherein the method further comprises determining that the second server receives the requests.

18. The non-transitory computer-readable medium of claim 15, wherein the method further comprises: in response to determining that the transmission of the session data to the second server is successful, selecting a third server of the computer system as a backup server to store the requests received from the first client through the connection broker.

\* \* \* \* \*